(12) United States Patent
Stark et al.

(10) Patent No.: US 7,007,156 B2
(45) Date of Patent: Feb. 28, 2006

(54) MULTIPLE COPROCESSOR ARCHITECTURE TO PROCESS A PLURALITY OF SUBTASKS IN PARALLEL

(75) Inventors: Gavin J. Stark, Fremont, CA (US); John Wishneusky, Fitzwilliam, NH (US)

(73) Assignee: Intel Corporation, Santa Clara, CA (US)

( * ) Notice: Subject to any disclaimer, the term of this patent is extended or adjusted under 35 U.S.C. 154(b) by 652 days.

(21) Appl. No.: 09/751,943

(22) Filed: Dec. 28, 2000

(65) Prior Publication Data

US 2002/0087827 A1    Jul. 4, 2002

(51) Int. Cl.
*G06F 9/00* (2006.01)
(52) U.S. Cl. ..................... 712/220; 712/34
(58) Field of Classification Search .............. 712/34, 712/35, 24, 22, 220
See application file for complete search history.

(56) References Cited

U.S. PATENT DOCUMENTS

| | | | | |
|---|---|---|---|---|
| 5,450,556 A | * | 9/1995 | Slavenburg et al. | 712/235 |
| 5,457,789 A | * | 10/1995 | Dietrich et al. | 711/100 |
| 5,548,587 A | * | 8/1996 | Bailey et al. | 370/395.7 |
| 5,673,319 A | * | 9/1997 | Bellare et al. | 713/181 |
| 5,974,537 A | * | 10/1999 | Mehra | 712/215 |
| 6,002,880 A | * | 12/1999 | Slavenburg | 712/24 |
| 6,028,844 A | * | 2/2000 | Hao et al. | 370/242 |
| 6,044,450 A | * | 3/2000 | Tsushima et al. | 712/24 |
| 6,182,203 B1 | * | 1/2001 | Simar et al. | 712/22 |
| 6,256,720 B1 | * | 7/2001 | Nguyen et al. | 712/23 |

OTHER PUBLICATIONS

Partridge et al.,"A 50-Gb/s IP Router," IEEE/ACM Tran. On Networking, vol. 6, No. 3, Jun. 1996, pp. 237-248.*

* cited by examiner

*Primary Examiner*—Eric Coleman
(74) *Attorney, Agent, or Firm*—Blakley, Sokoloff, Taylor & Zafman LLP

(57) ABSTRACT

A programmed state processing machine architecture and method that provides improved efficiency for processing data manipulation tasks. In one embodiment, the processing machine comprises a control engine and a plurality coprocessors, a data memory, and an instruction memory. A sequence of instructions having a plurality of portions are issued by the instruction memory, wherein the control engine and each of the processors is caused to perform a specific task based on the portion of the instructions designated for that component. Accordingly, a data manipulation task can be divided into a plurality of subtasks that are processed in parallel by respective processing components in the architecture.

22 Claims, 11 Drawing Sheets

MULTIPLE COPROCESSOR ARCHITECTURE TO PROCESS A PLURALITY OF SUBTASKS IN PARALLEL

BACKGROUND INFORMATION

1. Technical Field

The present invention generally concerns microprocessor and coprocessor architectures, and in more particular concerns an architecture that enables multiple coprocessors to operate in parallel to perform a wide array of data manipulation and processing tasks.

2. Background Information

Most microprocessors and microcontrollers comprise architectures that enable these components to be implemented in a variety of different systems that are designed to be used for a range of applications. However, because they are designed to support such diverse implementations, the performance of these microprocessors and microcontrollers under application-specific implementations is substantially reduced. In particular, it is desired to provide architectures that provide a high level of performance when implemented in programmable data manipulation systems while enabling support of a range of applications.

In attempting to address this problem, various processor architectures have been developed, including programmable DSPs (Digital Signal Processors). DSPs successfully support a range of digital signal processing algorithms, and are well-suited for applications in which digital signals must be rapidly processed. However, these devices are poor engines for many communication tasks often encountered in data manipulation systems.

Microprocessors such as the ARM and MIPS provide a general-purpose processor with the ability to attach coprocessors to perform application-specific functions, such as the foregoing communication tasks. This is because the general-purpose nature of the processor architecture makes it a poor choice for performing these tasks on its own. When coprocessors are implemented for such application-specific tasks, the coprocessors typically use the same instruction stream as the microprocessor. By utilizing the same instruction stream and data paths as the microprocessor, this architectures reduce the data I/O capabilities of the microprocessor. In addition, these scheme results in underutilization of both the processor and the coprocessor, since one is essentially at idle when the other is performing functions related to a particular instruction or set of instructions.

Tensilica has approached this problem by providing a configurable general-purpose microprocessor, whose instructions set can be extended to provide for application-specific tasks. While this scheme solves some of the problems that general-purpose processors suffer from, it doesn't solve some of the other problems discussed above.

In addition, some network processors incorporate microcontrollers on the data path that are fine tuned for particular applications, such as buffer management, header processing, and prioritization. While these devices provide very specific application support, they suffer from the lack of ability to easily enhance microcontrollers for other applications.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION

The present invention comprises a novel architecture that addresses many of the deficiencies in the prior art discussed above. The architecture includes a core control engine, such as microcontroller, that is optimized for managing the control flow of a data manipulation algorithm. The architecture additionally includes one or more task-specific coprocessors. Parallel instruction flows are issued from an instruction queue and are split into multiple portions, with appropriate portions being received by the control engine and each of the coprocessors, whereby both the control engine and the coprocessors may perform tasks during the same cycle. Depending on the particulars at the data manipulation tasks, multiple coprocessors may be implemented and operated in parallel to enhance performance.

Preferably, each coprocessor is selected to perform specific portions of an application task. Accordingly, since many applications require common tasks to be performed, such as data I/O and network communication, the coprocessors may be employed in a breadth of applications. Furthermore, an even wider breadth of application may be supported when considering architectures comprising multiple coprocessors in instances in which only the coprocessors required by that particular application are used.

Figure 1:
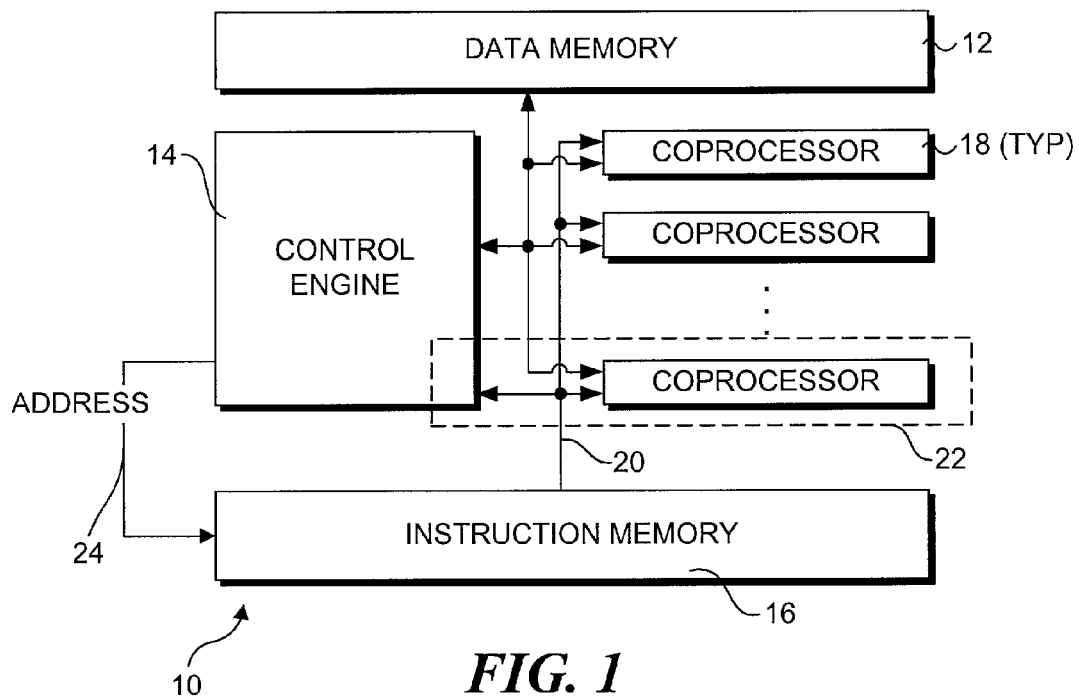
FIG. 1 is a schematic block diagram of a processing machine architecture in accordance with the present invention.

An exemplary architecture 10 in accordance with the present invention is depicted in FIG. 1. Architecture 10 includes data memory 12, a control engine 14, instruction memory 16, and a plurality of coprocessors 18. Each of coprocessors 18 is linked in bi-directional communications with control engine 14 and data memory 12, and receives a portion or portions of a split instruction 20 from instruction memory 16. Similarly, control engine 14 is linked in bi-directional communication with data memory 12, and receives the remaining portion of split instruction 20 from instruction memory 16. Typically, control engine 14 may comprise a microcontroller or a similar type of processor that is commonly implemented in control tasks.

Figure 2:
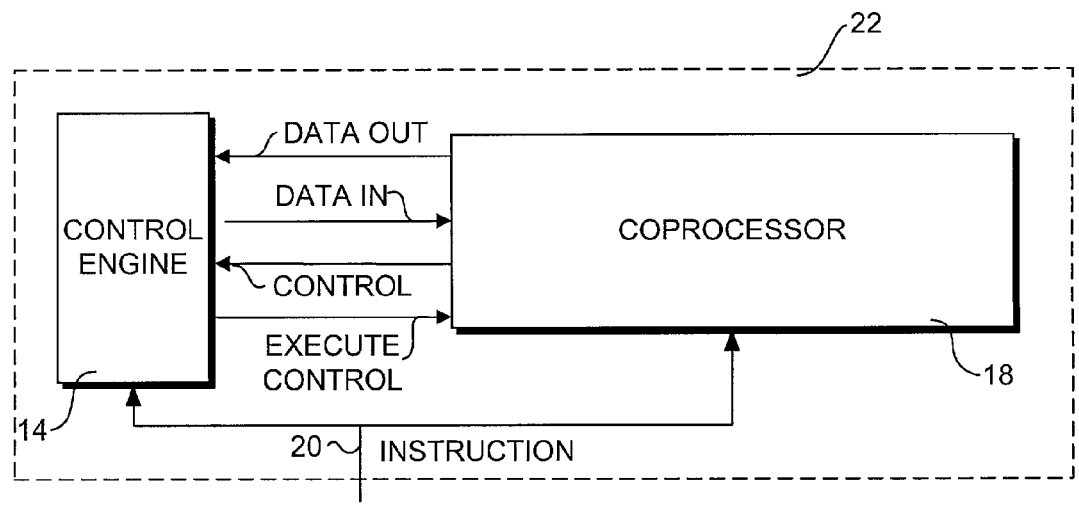
FIG. 2 is a schematic block diagram illustrating the communication signals between the control engine and a coprocessor of FIG. 1.

A detailed view 22 of the bi-directional communication between a coprocessor 18 and control engine 14 is illustrated in FIG. 2. Control engine 14 passes data to coprocessor 18 via a "DATA IN" path, while coprocessor 18 passes data to control engine 14 via a "DATA OUT" path. Also, control execution signals are passed from control engine 14 to coprocessor 18 via an "EXECUTE CONTROL" path, while control signals are passed from a coprocessor to the control engine via a "CONTROL" path. In addition to the connections shown in FIGS. 1 and 2, each of coprocessors 18 may also have one or more other interfaces (not shown).

As discussed above, instructions from instruction memory 16 are split into two or more portions such that each of control engine 14 and coprocessors 18 are simultaneously supplied with an instruction portion. The split instructions from instruction memory 16 are issued in response to an instruction address 24 passed from control engine 14 to instruction memory 16.

Figure 3:
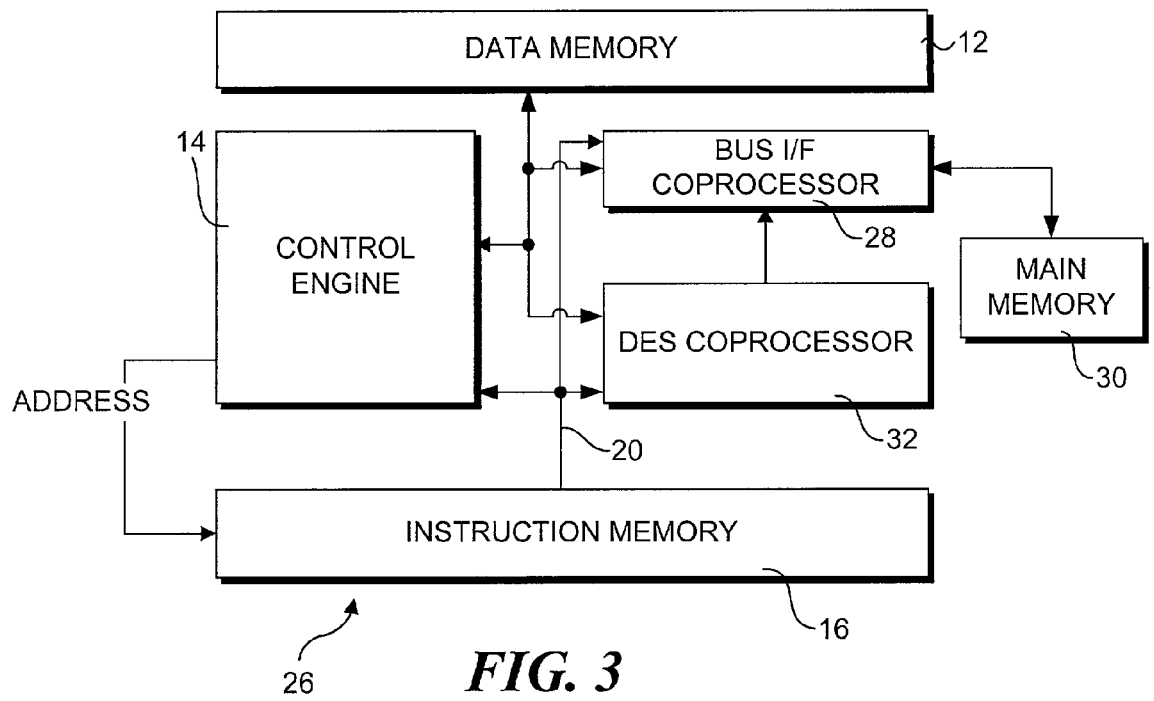
FIG. 3 is a schematic diagram of a first exemplary implementation of the architecture depicted in FIG. 1 corresponding to a data encryption process.

A first exemplary implementation of architecture 10 comprising a Data Encryption Standard (DES) machine 26 is shown in FIG. 3. In DES machine 26, the coprocessors comprise a bus interface (I/F) coprocessor 28, which is used to provide a bi-directional data path with a main memory 30, and a DES coprocessor 32, which is used to encrypt data through use of a standard encryption algorithm.

Figure 4:
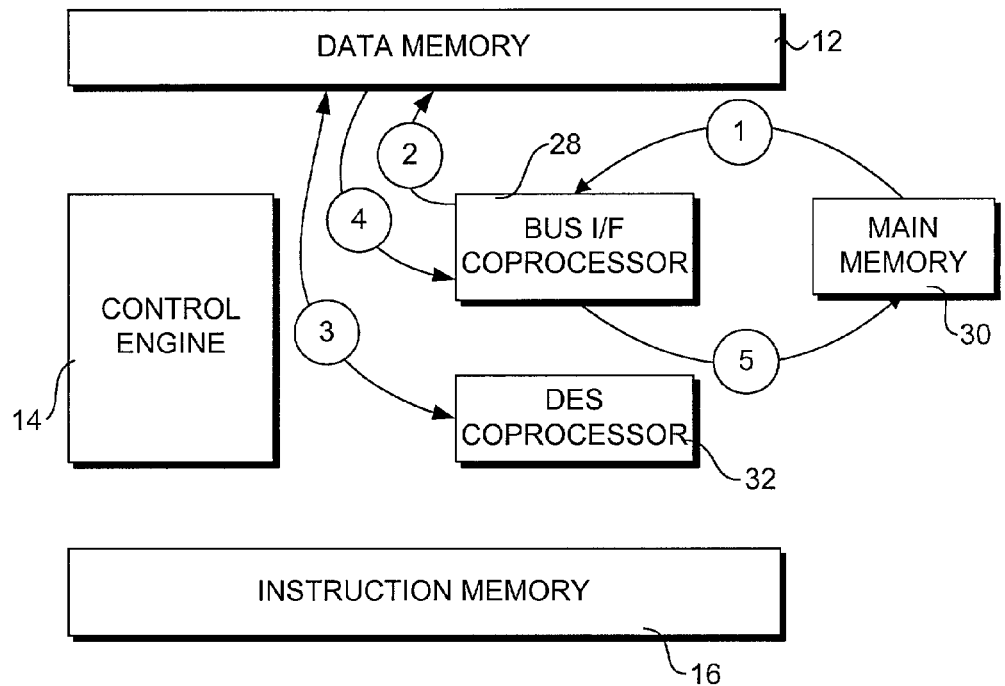
FIG. 4 is a schematic diagram illustrating the data transfer paths used during the data encryption process.
Figure 5:
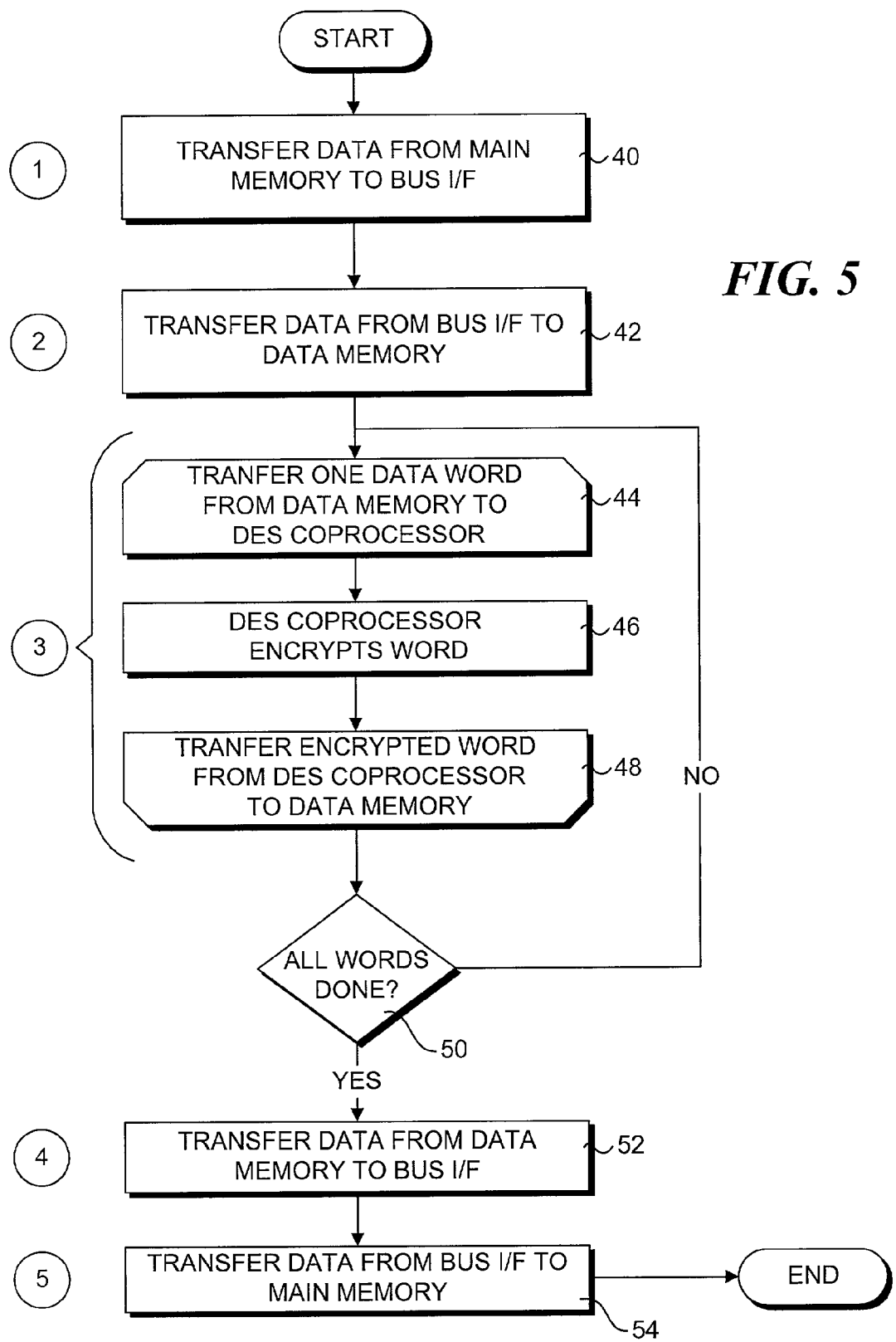
FIG. 5 is a flowchart illustrating the logic used when performing the data encryption process.

An exemplary use of DES machine 26 comprising encrypting some data stored in main memory 30 is now discussed with reference to the logic diagram of FIG. 4 and transfer paths depicted in FIG. 5, wherein data transfer paths are identified by encircled numbers. As indicated by a block 40 and a transfer path "1," the process begins with a transfer of data from main memory 30 to bus I/F coprocessor 28. This data is then transferred from bus I/F coprocessor 28 to data memory 12, as indicated by a block 42 and a transfer path "2." Next, in accord with a start loop block 44 and a transfer path "3," data is transferred one word at a time from data memory 12 to DES coprocessor 32. Upon receiving each word, DES coprocessor 32 encrypts the word in accordance with the standard encryption algorithm, as provided by a block 46. The encrypted word is then transferred from DES coprocessor 48 to data memory 12 via transfer path "3," thereby completing the loop, as indicated by a loop end block 48.

A decision block 50 is provided to determine whether all of the words corresponding to the data that was originally transferred have been encrypted and passed to data memory 12. Once all of the words have been passed to data memory 12, the logic proceeds to a block 52, in which data comprising all of the encrypted words is transferred from data memory 12 to bus I/F coprocessor 28, as indicated by a transfer path "4.". The process is completed in a block 54, in which the encrypted data is transferred from bus I/F coprocessor 28 to main memory 30, as indicated by a transfer path "5."

Figure 6:
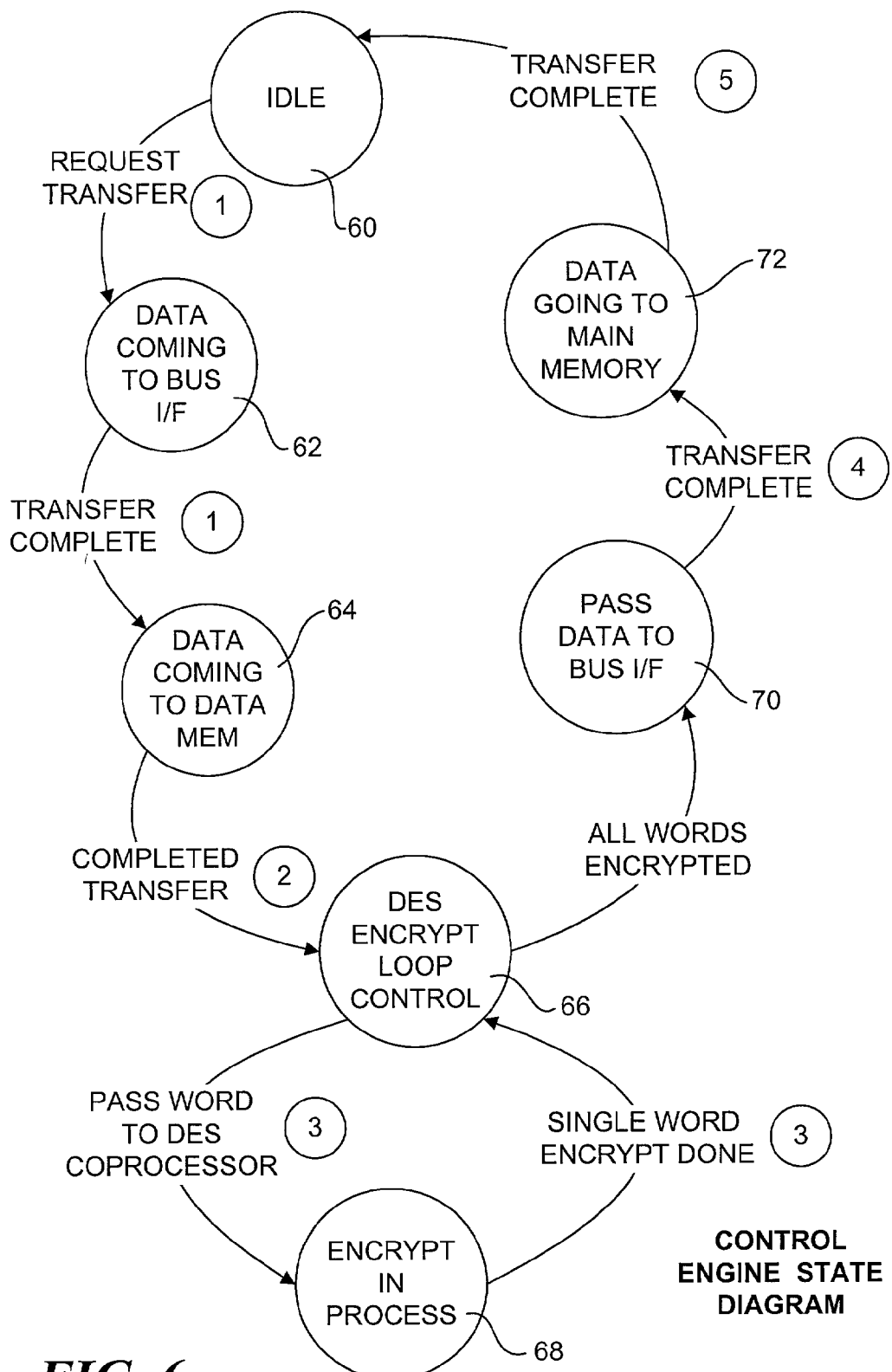
FIG. 6 is a state machine diagram illustrating the processing state of the control engine during the data encryption process.

In the foregoing encryption process, each of the various activities of bus I/F coprocessor 28 and DES coprocessor 32 is performed in response to control signals provided by control engine 14. A state machine diagram illustrating various states of control engine 14 during the encryption process is shown in FIG. 6. At the beginning of the process, the control engine is in an idle state 60. Control engine 14 then sends an execute control signal to bus I/F coprocessor 28 to request transfer of data from main memory 30. In response, data begins to be transferred from main memory 30 to bus I/F coprocessor 28, as depicted by a state 62. Upon completion of the transfer of data to bus I/F coprocessor 28, control engine 14 sends an execute control signal to bus I/F coprocessor 28 to transfer the data from the bus I/F to data memory 12, causing data to begin arriving at data memory 12, as indicated by a state 66.

Once the transfer of data between bus I/F coprocessor 28 and data memory 12 is completed, the state proceeds to a state 64 corresponding to the passing of words to DES coprocessor 32 for encryption. In accord with a lower loop of the state machine diagram, each word that is passed is encrypted by the DES coprocessor, as depicted by a state 68, and the encrypted word is passed back to data memory 12, returning control engine 14 to a state 66. After all of the words have been encrypted and passed back to data memory 12, control engine 14 is advanced to a state 70, corresponding to the encrypted data being passed from data memory 12 to bus I/F coprocessor 28. The completion of the data transfer leads to a state 72 in which the encrypted data is passed to main memory 30. Upon completion of this last data transfer, the process is complete, and the state of control engine 14 returns to idle state 60.

Figure 7:
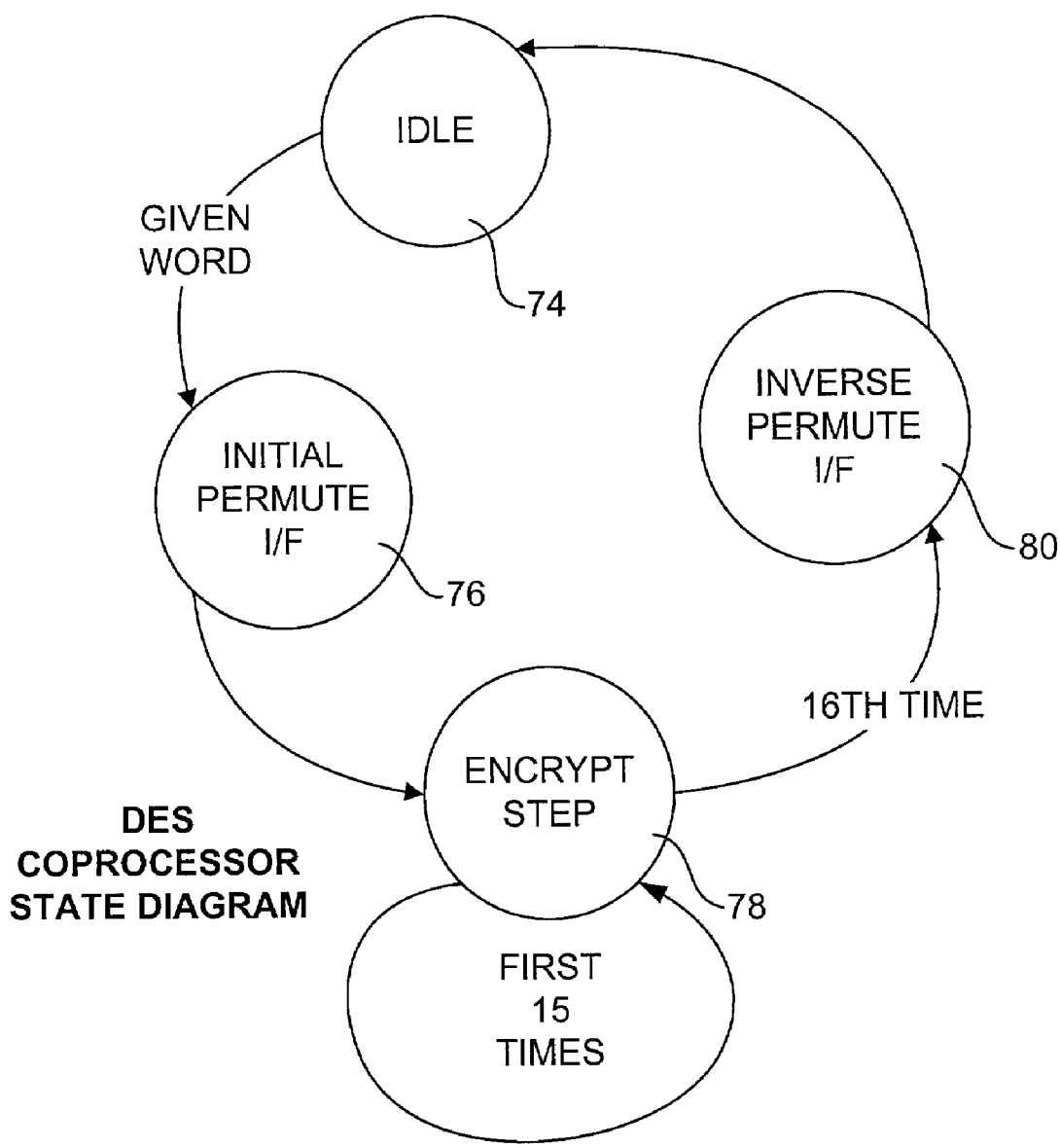
FIG. 7 is a state machine diagram illustrating the processing states of a data encryption coprocessor during the data encryption process.

A state machine diagram for DES coprocessor 32 is shown in FIG. 7. The DES coprocessor starts in an initial idle state 74, and is advanced to an initial permutation I/F state 76 upon receiving a word from data memory 12. Next, the state is advanced to an encryption step state 78, which comprises processing the word 15 times [Please correct this]. Upon the 16$^{th}$ time through the loop, the state proceeds to an inverse permutation I/F state 80, after which the DES coprocessor 32 returns to idle state 74. In accord with the foregoing discussion, the DES coprocessor may include multiple state copies to do many DES operations in parallel or sequentially. Furthermore, the DES coprocessor may also support a state machine for decryption, which substantially comprises the reverse process depicted in FIG. 7.

Figure 8:
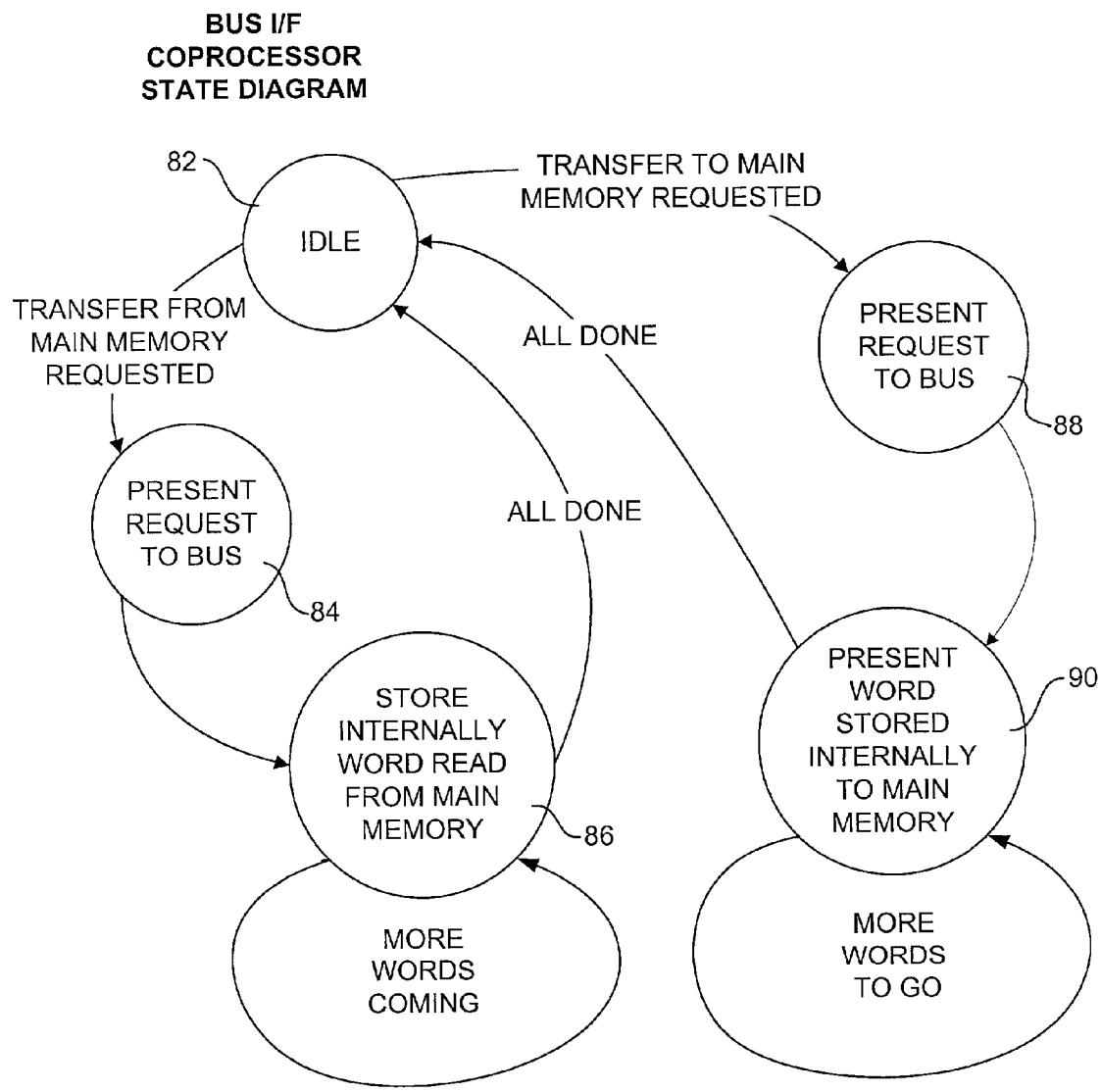
FIG. 8 is a state machine diagram illustrating the processing states of a bus interface coprocessor during the data encryption process.

FIG. 8 shows a state machine diagram for bus I/F coprocessor 28, wherein the left side of the diagram corresponds to transfers of data from main memory 30 to bus I/F coprocessor 28, while the right side of the diagram pertains to transfers of data from bus I/F coprocessor 28 back to main memory 30. Initially, bus I/F coprocessor 28 is in an idle state 82. To initiate receiving data from main memory 30, a transfer of data from main memory 30 is requested via an instruction 20 issued from bus I/F coprocessor 28 based on an address passed to instruction memory 16 from control engine 14, advancing bus I/F coprocessor 28 to a state 84 in which the request is presented to the bus. Next, in a state 86, the word read in from main memory 30 is internally stored. During this state, the internal data stored can be written and read by control engine 14 over the data bus (i.e., transfers "2" and "4") or copied to data memory 12 over the data bus.

This process is repeated until all the words have been stored, whereupon the storage of the data is complete, and the state returns to idle state 82.

To initiate transfer of data back to main memory 30, a corresponding transfer request is issued, advancing bus I/F coprocessor 28 to a state 88 in which the request is presented to the bus. In response, the state advances to a state 90, whereby words stored internally are transferred to main memory 30 one word at a time until all of the words have been transferred, returning bus I/F coprocessor 28 to idle state 84.

Figure 9:
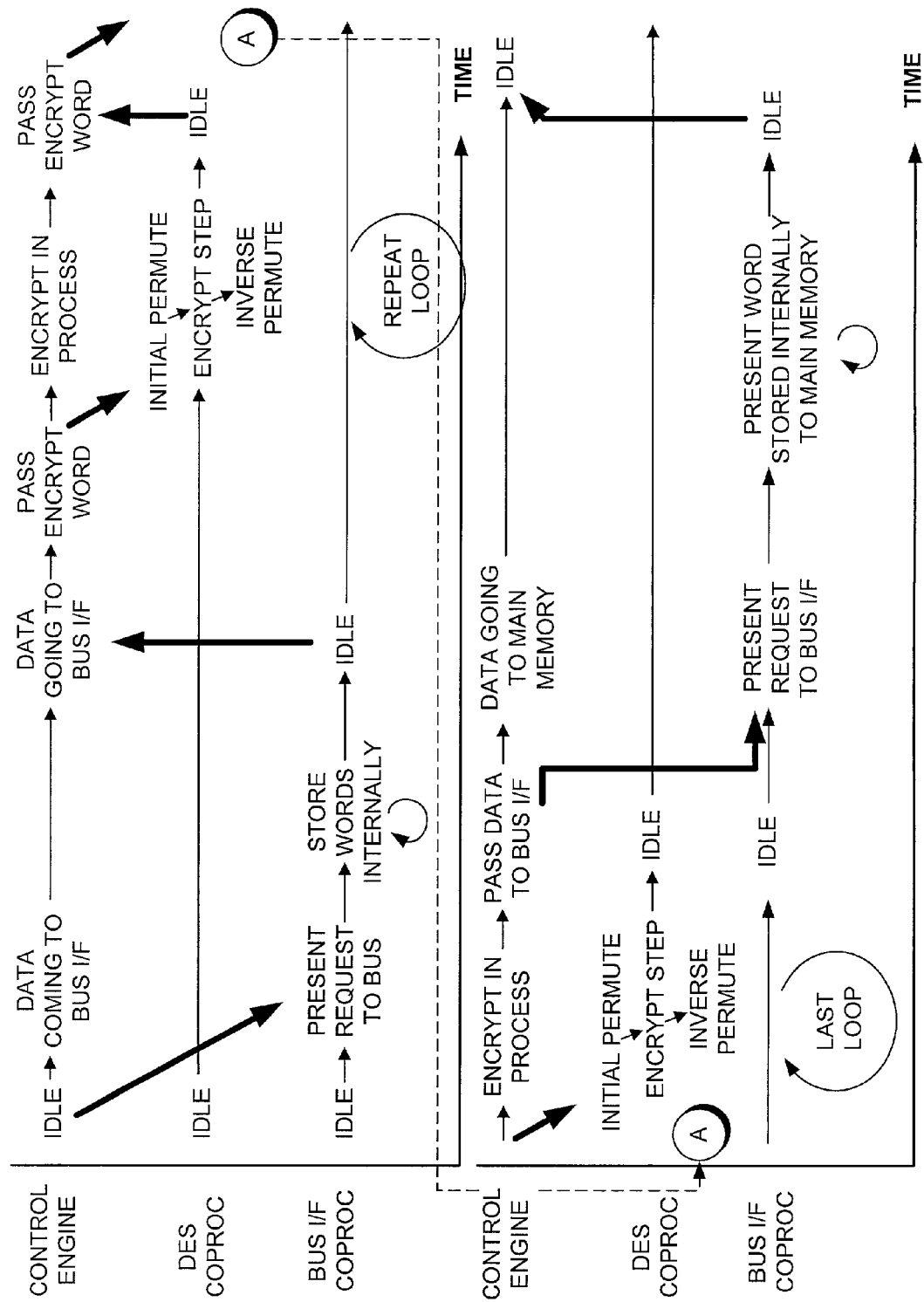
FIG. 9 is a timing diagram illustrating the relative timing of the states of the control engine data encryption coprocessor, and bus interface coprocessor during the data encryption process.

A timing diagram illustrating the relative timing between the states of control engine 14, DES coprocessor 32, and bus I/F coprocessor 28 is shown in FIG. 9. This timing is synchronized through the use of split instructions 20, whereby a portion of each instruction is processed by each of control engine 14, DES coprocessor 32, and bus I/F coprocessor 28. Accordingly, each of these processing components is enabled to execute instructions in parallel, thereby enhancing the efficiency of machines that implement architectures in accord with architecture 10.

Figure 10:
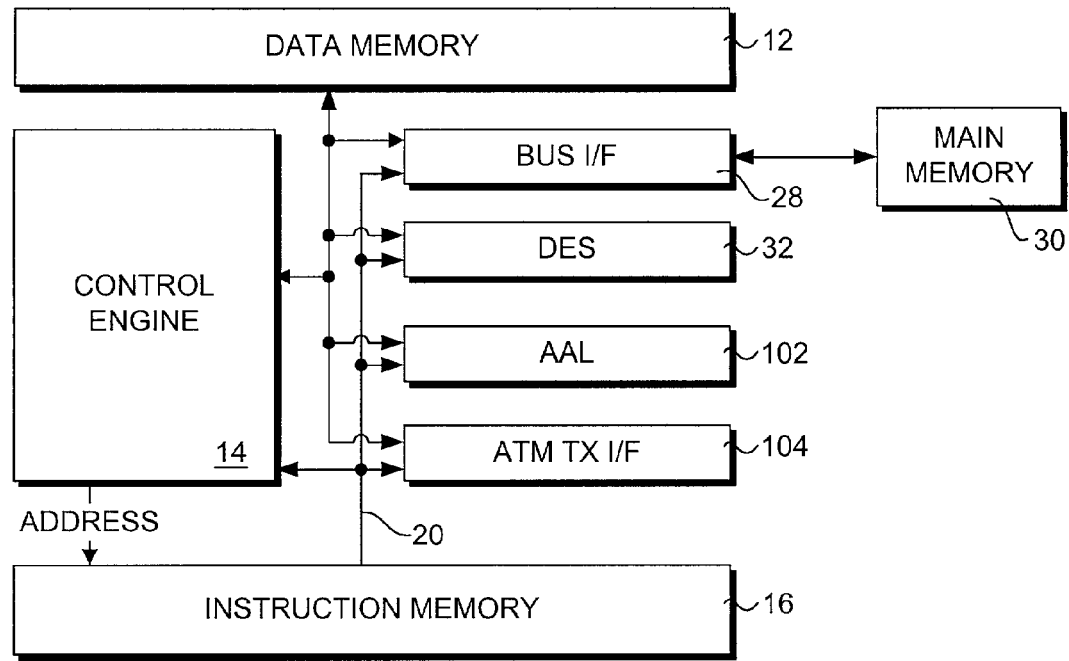
FIG. 10 is a schematic block diagram of a second exemplary implementation of the architecture of FIG. 1, further adding an ATM (Asynchronous Transfer Mode) transfer interface coprocessor and an AAL (ATM Adaptation Layer) coprocessor to the implementation of FIG. 3.

Another exemplary implementation of architecture 10 comprising a DES and ATM (Asynchronous Transfer Mode) transfer machine 100 is shown in FIG. 10. DES and ATM machine 100 performs ATM transfer of data in addition to the DES functions provided DES machine 26 discussed above. Accordingly, the following discussion pertains to the additional functionality provided by DES and ATM transfer machine 100; it will be understood that the prior DES functionality discussed above is applicable to this machine as well.

DES and ATM transfer machine 100 comprises four coprocessors in addition to data memory 12, control engine 14, and instruction memory 16. These coprocessors include a bus I/F coprocessor 28, a DES coprocessor 32, an AAL (ATM Adaptation Layer) coprocessor 102, and an ATM transfer (TX) I/F coprocessor 104. As before, bus I/F coprocessor 28 is linked in bi-directional communication with main memory 30.

Figure 11:
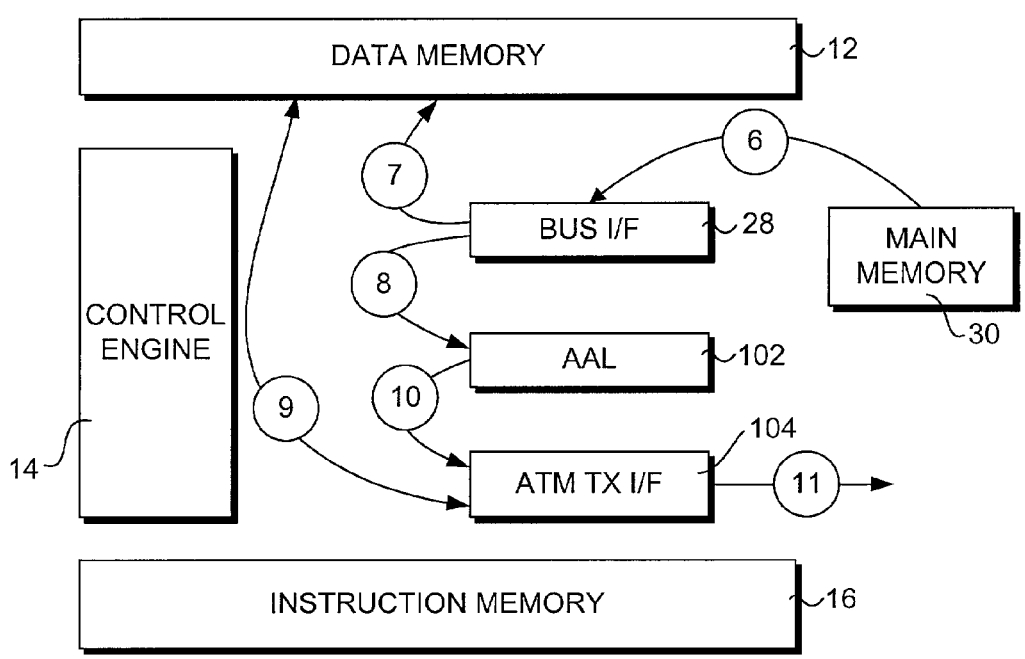
FIG. 11 is a schematic block diagram illustrating the data transfer paths used to perform ATM data transfers.
Figure 12:
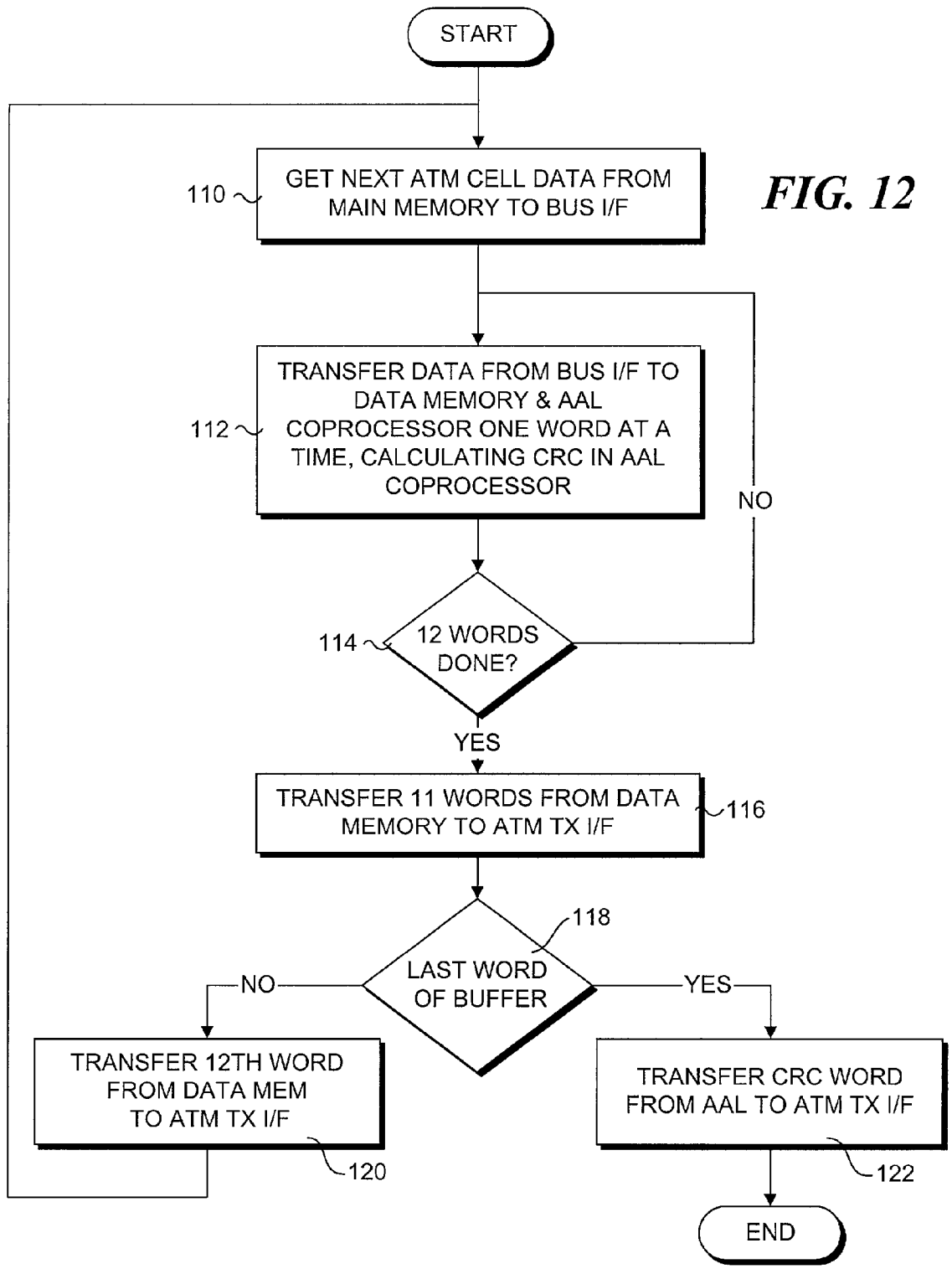
FIG. 12 is a flowchart illustrating the logic used when processing data to be transferred externally via the ATM transfer interface coprocessor.

With reference to the flowchart of FIG. 12 and the transfer paths depicted in FIG. 11, an exemplary process that may be implemented with DES and ATM transfer machine 100 begins in a block 110 in which a next ATM data cell is transferred from main memory 30 to bus I/F coprocessor 28. ATM data cells comprise 53 bytes, including 5 bytes of header information and 48 bytes of payload data, comprising 12 4-byte words. This activity is depicted as a transfer path "6" in FIG. 11.

Next, in a block 112, data is transferred from bus I/F processor 28 to data memory 12 and AAL coprocessor 102 one word at a time, as indicated by transfer paths "7" and "8," and the CRC (Cyclic Redundancy Check) is calculated by the AAL coprocessor. Preferably, the transfer of data on transfer paths "7" and "8" are performed simultaneously. This process is repeated for each of the 12 words, as provided by a decision block 114. Upon transfer of all 12 words, the first 11 words are transferred from data memory 12 to ATM TX I/F coprocessor 104 in a block 116, as indicated by a transfer path 9. As provided by a decision block 118, if the present word is not the last word of the buffer, the 12 word is also transferred along path 9 from data memory 12 to ATM TX I/F in a block 120, and the logic loops back to block 110 to process the next ATM cell. However, if the word is the last word in the buffer of words to be transferred, the CRC word is transferred from AAL coprocessor 102 to ATM TX I/F coprocessor 204 via a transfer path 10 in a block 122, completing the process.

Figure 13:
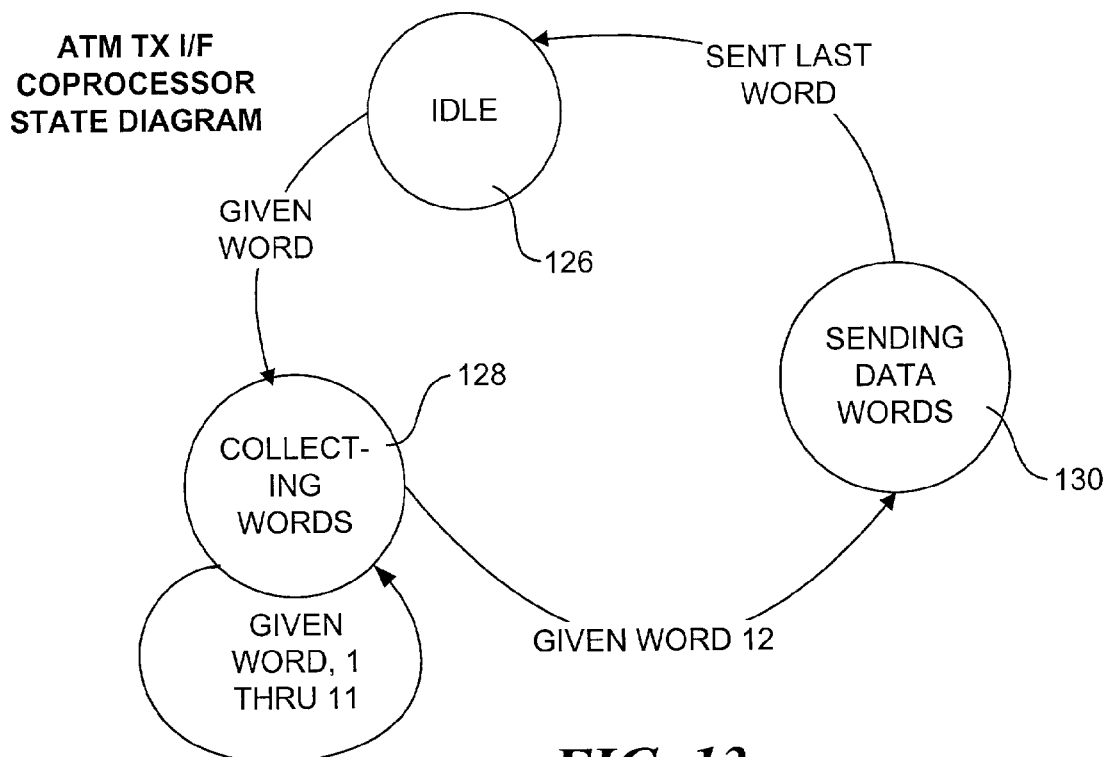
FIG. 13 is a state machine diagram illustrating the processing states of the ATM transfer interface coprocessor during a data transfer operation.

FIG. 13 shows a state machine diagram corresponding to ATM TX I/F coprocessor 104 during the foregoing process. At the start of the process, ATM TX I/F coprocessor 102 is in an idle state 126. As words are transferred from data memory 12 to the ATM TX I/F coprocessor, its state is advanced to a collecting words state 128. Upon receiving the $12^{th}$ word, a state 130 corresponding to sending out data words to be externally received by an ATM client (as indicated by a transfer path 11) is activated. After the last word of data is sent out, ATM TX I/F coprocessor 104 returns to idle state 126.

Figure 14:
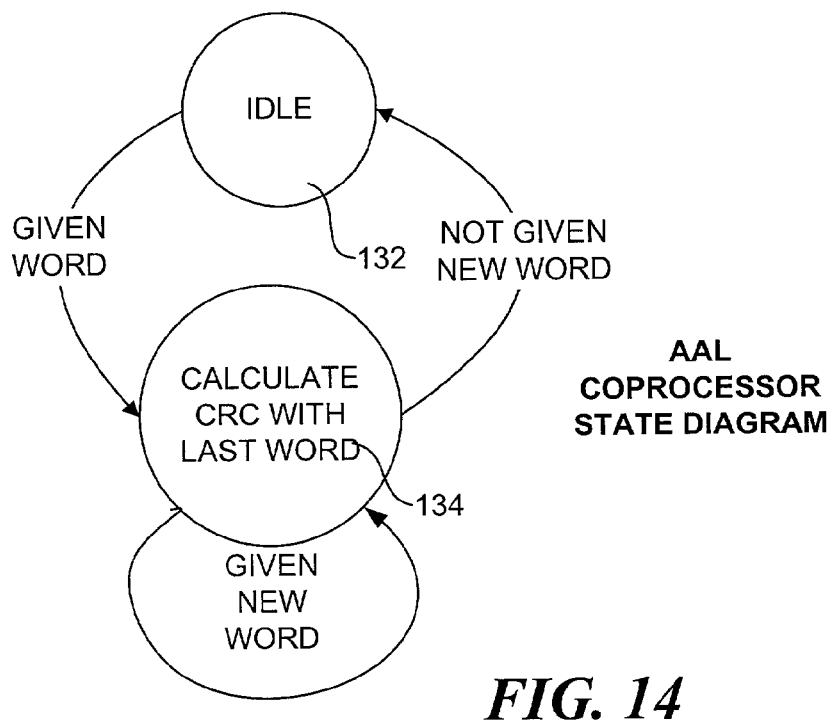
FIG. 14 is a state machine diagram illustrating the processing states of the AAL coprocessor during the data transfer operation.

A similar state machine diagram for AAL coprocessor 102 is shown in FIG. 14. This coprocessor has two states: an idle state 132 and a CRC calculation state 134. As new words are received by AAL coprocessor 102, the coprocessor examines the word to see if it is the last word. If it is, the CRC is calculated during state 134. The AAL coprocessor's state is at idle when it is not receiving new data.

Figure 15:
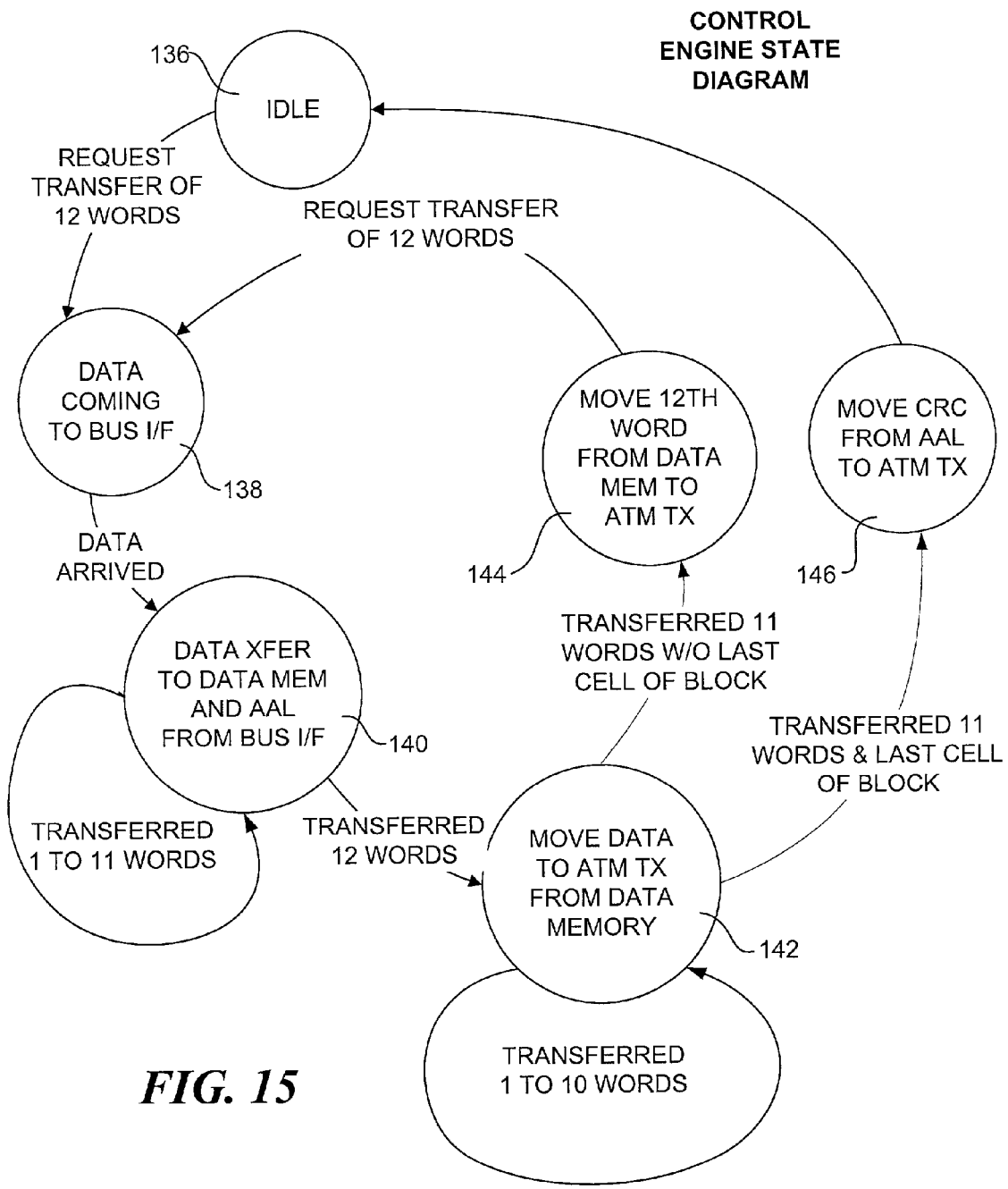
FIG. 15 is a state machine diagram illustrating the processing states of the control engine during the data transfer operation.

The state machine diagram for control engine 14 corresponding to the DES and ATM machine embodiment is shown in FIG. 15. As with the coprocessors, control engine 14 begins each process in an idle state 136. After requesting transfer of 12 words of data from main memory 30 to bus I/F coprocessor 28, The control engine proceeds to a state 138 during which data is received by bus I/F coprocessor 28. Upon arrival of all of the requested data, the data is simultaneously transferred from bus I/F coprocessor 28 to each of data memory 12 and AAL coprocessor 102, as provided by a state 140. This state is maintained during transfer of the first 11 words, whereupon the state is advanced to a state 142 in response to transfer of the $12^{th}$ word. In state 142, data is moved to ATM TX I/F coprocessor 104 from data memory 12. This transfer is continued until the first 11 words have been transferred. If the current ATM cell is not the last cell in the data block, the state is advanced to a state 144 in which the $12^{th}$ word is moved from data memory 12 to ATM TX I/F coprocessor 104, and a request for transfer of the next 12 words is made, returning the state to state 138. If the current ATM cell is the last cell in the data block, the state advances to a state 146 in which the CRC is moved from AAL coprocessor 102 to ATM TX I/F coprocessor 104, after which the state returns to idle state 136.

The above description of illustrated embodiments of the invention is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. Accordingly, it is not intended that the scope of the invention in any way be limited by the above description, but instead be determined entirely by reference to the claims that follow.

What is claimed is:

1. A processing machine comprising:
   (a) a data memory;
   (b) a control engine, linked in bi-directional communication with the data memory;
   (c) an instruction memory in which instructions may be stored, having an input for receiving control information from the control engine; and
   (d) a plurality of coprocessors, each connected in communication with the data memory, the instruction memory, and the control engine, the control engine and the plurality of coprocessors each coupled to receive a portion of a single instruction from the instruction memory in parallel, each of said control engine and plurality of coprocessors being enabled to perform simultaneous functions in response to the single instruction, wherein at least one of the plurality of coprocessors is linked in bi-directional communication with the control engine independent of the instruction memory.

2. The processing machine of claim 1, wherein the control engine comprises a microcontroller.

3. The processing machine of claim 1, further comprising a main memory linked in communication with at least one of said plurality of coprocessors.

4. The processing machine of claim 3, wherein said at least one coprocessor comprises a bus interface coprocessor.

5. The processing machine of claim 1, wherein the processing machine is used to perform a particular task and wherein each coprocessor is designated to perform at least one specific subtask of that particular task.

6. The processing machine of claim 5, wherein the particular task comprises processing a data manipulation algorithm, and specific subtasks performed by separate coprocessors include a memory bus interface function and a data processing algorithm function.

7. The processing machine of claim 6, wherein the data processing algorithm comprises an encryption algorithm.

8. A processing machine comprising:
(a) a data memory;
(b) a main memory;
(c) a microcontroller, linked in bi-directional communication with the data memory;
(d) an instruction memory in which instructions may be stored, having an input for receiving control information from the microcontroller, the microcontroller having an input to receive instructions from the instruction memory;
(e) a first coprocessor providing a bus interface function when operational, linked in communication with each of the main memory, the data memory, and the microcontroller, and having an input to receive instructions from the instruction memory; and
(f) a second coprocessor, linked in communication with the data memory and the microcontroller and having an input to receive instructions from the instruction memory, wherein the microcontroller and the first and second coprocessors are coupled to receive the instructions from the instruction memory in parallel, wherein the second coprocessor is linked in bi-directional communication with the microcontroller independent of the instruction memory and the data memory.

9. The processing machine of claim 8, further comprising: a third coprocessor, linked in communication with the data memory and the microcontroller and having an input to receive instructions from the instruction memory.

10. The processing machine of claim 9, further comprising:
a fourth coprocessor, linked in communication with the data memory and the microcontroller and having an input to receive instructions from the instruction memory.

11. The processing machine of claim 8, wherein each of the first and second coprocessors and the microcontroller perform simultaneous coordinated functions in response to a single instruction issued from the instruction memory.

12. The processing machine of claim 8, wherein the second coprocessor is enabled to process a data manipulation algorithm.

13. The processing machine of claim 9, wherein the third coprocessor is enabled to perform an asynchronous transfer mode ("ATM") data transfer interface function.

14. The processing machine of claim 10, wherein the third coprocessor is enabled to perform an asynchronous transfer mode ("ATM") data transfer interface function when operational and the fourth coprocessor is enabled to perform an ATM Adaptation Layer (AAL) function when operational.

15. A method of processing a data manipulation task with a processing machine including a control engine and a plurality of coprocessors, comprising;
dividing the data manipulation task into a plurality of subtasks;
issuing a sequence of instructions having a plurality of portions to the control engine and each of said plurality of coprocessors;
simultaneously receiving corresponding portions of the instructions in parallel at the control engine and each of said plurality of coprocessors;
performing separate subtasks with the control engine and each of said plurality of coprocessors by executing the corresponding portions of the instructions received by the control engine and each of said plurality of coprocessors;
coordinating the execution of each portion of instructions received by the control engine and each of said plurality of coprocessors such that the subtasks performed by these components are performed substantially in parallel; and
storing results of the execution of the portion of the instruction received by the control engine into data memory, the data memory being linked in bi-directional communication with the control engine and each of said plurality of coprocessors, and wherein at least one of said plurality of coprocessors is linked in bi-directional communication with the control engine independent of the instruction memory and the data memory.

16. The method of claim 15, wherein the coordination of the execution of the portions of instructions is performed by the control engine via execution control signals sent to each of said plurality of coprocessors.

17. The method of claim 16, wherein the processing machine comprises a programmed state machine and wherein each of the control engine and said plurality of coprocessors is caused to cycle through a respective set of machine states in response to instruction portions received by that component.

18. The method of claim 15, wherein one of the subtasks comprises a bus interface function.

19. The method of claim 15, wherein the control engine comprises a microcontroller.

20. The method of claim 15, wherein each instruction is issued from an instruction memory in response to an address sent to the instruction memory from the control engine.

21. The processing machine of claim 1, further comprising:
a DATA OUT path coupling the control engine to one of the plurality of coprocessors to communicate data from the one of the plurality of coprocessors to the control engine; and
a DATA IN path coupling the control engine to the one of the plurality of coprocessors to communicate data from the control engine to the one of the plurality of the coprocessors, the DATA OUT path and the DATA IN path enabling the bi-directional communication between the control engine and the one of the plurality of coprocessors independent of the instruction memory and independent of the data memory.

22. The processing machine of claim 21, wherein the DATA OUT path and the DATA IN path comprise datapaths directly coupling the control engine to the one of the plurality of coprocessors.

* * * * *

UNITED STATES PATENT AND TRADEMARK OFFICE
CERTIFICATE OF CORRECTION

PATENT NO. : 7,007,156 B2
APPLICATION NO. : 09/751943
DATED : February 28, 2006
INVENTOR(S) : Stark et al.

Page 1 of 1

It is certified that error appears in the above-identified patent and that said Letters Patent is hereby corrected as shown below:

Column 1, at line 42, delete "this" and insert --these--.

Signed and Sealed this

Sixth Day of November, 2007

JON W. DUDAS
*Director of the United States Patent and Trademark Office*